United States Patent
Clemen

(10) Patent No.: US 10,174,947 B1
(45) Date of Patent: Jan. 8, 2019

(54) COMBUSTION CHAMBER TILE OF A GAS TURBINE AND METHOD FOR ITS MANUFACTURE

(71) Applicant: Rolls-Royce Deutschland Ltd & Co KG, Blankenfelde-Mahlow (DE)

(72) Inventor: Carsten Clemen, Mittenwalde (DE)

(73) Assignee: Rolls-Royce Deutschland Ltd & Co KG, Blakenfelde-Mahlow (DE)

( * ) Notice: Subject to any disclaimer, the term of this patent is extended or adjusted under 35 U.S.C. 154(b) by 1342 days.

(21) Appl. No.: 14/072,498

(22) Filed: Nov. 5, 2013

(30) Foreign Application Priority Data

Nov. 13, 2012 (DE) .......... 10 2012 022 259

(51) Int. Cl.
  *F23R 3/00* (2006.01)
  *B23B 35/00* (2006.01)
  *B23B 41/14* (2006.01)

(52) U.S. Cl.
  CPC .............. *F23R 3/007* (2013.01); *B23B 35/00* (2013.01); *B23B 41/14* (2013.01); *F23R 3/002* (2013.01); *F23R 3/005* (2013.01)

(58) Field of Classification Search
  CPC ........ F02C 7/12; F02C 7/18; F05D 2260/203; F05D 2260/202; F23R 3/04; F23R 3/16; F23R 3/60; F23R 3/002; F23R 3/06; F23R 2900/03041; F23R 2900/03042; F23R 2900/03043; F23R 2900/03045; F23R 3/045; F23R 3/10
  USPC ........................................................ 60/759
  See application file for complete search history.

(56) References Cited

U.S. PATENT DOCUMENTS

| 2,916,878 A | 12/1959 | Wirt | |
|---|---|---|---|
| 2,979,898 A | 4/1961 | Ward | |
| 3,545,202 A * | 12/1970 | Batt | F23R 3/08 60/757 |
| 3,899,876 A * | 8/1975 | Williamson | F23R 3/002 431/352 |
| 4,302,941 A * | 12/1981 | DuBell | F23R 3/08 60/757 |
| 4,622,821 A | 11/1986 | Madden | |

(Continued)

FOREIGN PATENT DOCUMENTS

| DE | 69104006 | 2/1995 |
|---|---|---|
| DE | 10214570 | 1/2004 |

(Continued)

OTHER PUBLICATIONS

German Search Report dated Jun. 19, 2013 from counterpart application No. DE 10 2012 022 259.9.

(Continued)

*Primary Examiner* — Carlos A Rivera
(74) *Attorney, Agent, or Firm* — Shuttleworth & Ingersoll, PLC; Timothy Klima

(57) ABSTRACT

The present invention relates to a combustion chamber tile of a gas turbine, where the combustion chamber tile has a plurality of effusion cooling holes and a mixing air hole provided as a flow-guiding element (chute) and projecting over the surface of the combustion chamber tile, characterized in that on the side of the mixing air hole facing away from a flow along the combustion chamber tile at least one supporting element is arranged on the combustion chamber tile and on the mixing air hole. It also relates to a method for its manufacture.

13 Claims, 6 Drawing Sheets

(56) References Cited

U.S. PATENT DOCUMENTS

| | | | | |
|---|---|---|---|---|
| 4,653,279 | A * | 3/1987 | Reynolds | F23R 3/06 60/755 |
| 4,805,397 | A * | 2/1989 | Barbier | F23R 3/002 60/759 |
| 4,875,339 | A * | 10/1989 | Rasmussen | F23R 3/045 60/757 |
| 5,144,793 | A * | 9/1992 | Able | F23R 3/045 60/757 |
| 5,209,067 | A | 5/1993 | Barbier et al. | |
| 5,235,805 | A * | 8/1993 | Barbier | F23R 3/26 60/39.23 |
| 5,402,635 | A * | 4/1995 | Smith | F23R 3/48 60/39.37 |
| 5,501,071 | A | 3/1996 | Ansart et al. | |
| 6,155,056 | A * | 12/2000 | Sampath | F23R 3/002 60/756 |
| 6,170,266 | B1 * | 1/2001 | Pidcock | F23R 3/06 60/755 |
| 7,059,133 | B2 | 6/2006 | Gerendas | |
| 8,448,443 | B2 * | 5/2013 | Berry | F23R 3/045 60/754 |
| 9,377,200 | B2 | 6/2016 | Sandelis | |
| 2011/0030378 | A1 | 2/2011 | Carlisle | |
| 2013/0283806 | A1 * | 10/2013 | Monaghan | F23R 3/045 60/754 |

FOREIGN PATENT DOCUMENTS

| | | |
|---|---|---|
| EP | 0481885 | 4/1992 |
| EP | 972992 | 1/2000 |
| EP | 2856036 A2 | 4/2015 |
| GB | 2113377 | 8/1983 |
| GB | 2444736 | 6/2008 |
| WO | WO2013175126 A2 | 11/2013 |

OTHER PUBLICATIONS

European Search Report dated Jan. 20, 2014 from counterpart App No. 13191946.

European Office Action dated Dec. 8, 2016 for counterpart European Application No. 13191946.6.

* cited by examiner

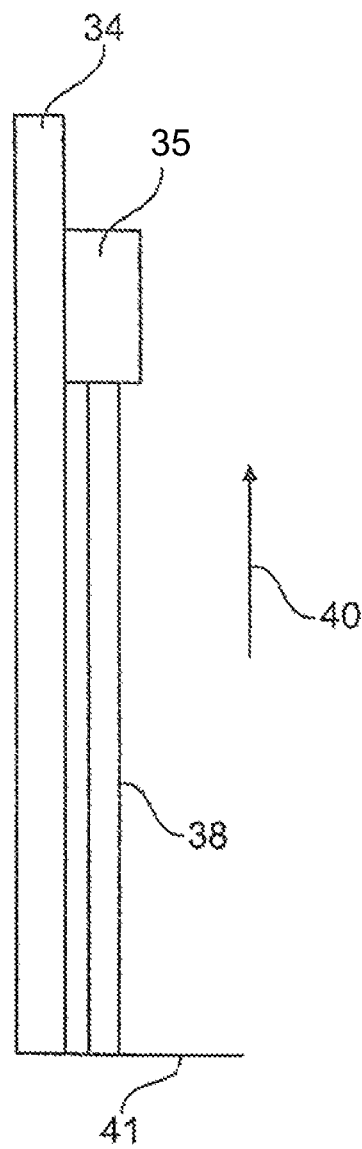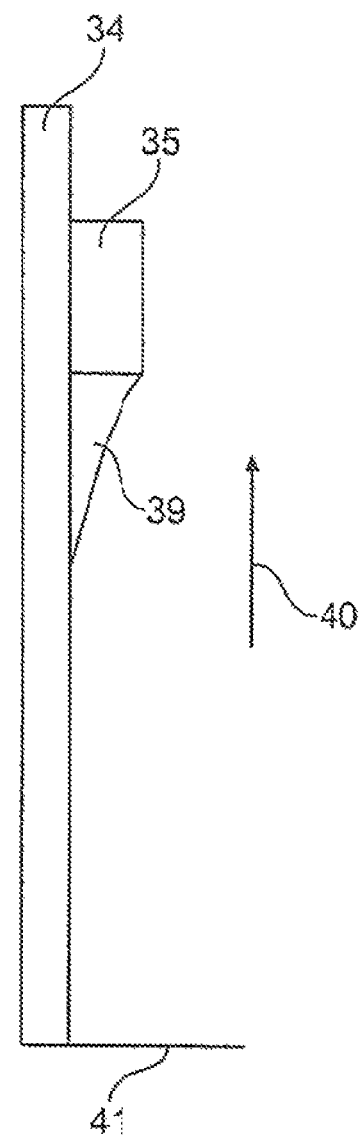
Fig. 4
(Prior Art)
Fig. 5

COMBUSTION CHAMBER TILE OF A GAS TURBINE AND METHOD FOR ITS MANUFACTURE

CROSS-REFERENCE TO RELATED APPLICATIONS

This application claims priority to German Patent Application No. DE102012022259.9 filed Nov. 13, 2012, which application is incorporated by reference herein.

BACKGROUND OF THE INVENTION

This invention relates to gas-turbine combustion chambers with combustion chamber tiles, where the combustion chamber tiles are fastened to a supporting structure of the combustion chamber outer was.

The combustion chamber tiles have an arbitrary number (very high, often in the thousands) of effusion cooling holes on the side facing the combustion chamber. These effusion cooling holes are used to cool the tile against the high temperatures in the combustion chamber. Moreover, at least one mixing air hole is located on the combustion chamber tile and is used to pass air from the space (annulus) surrounding the combustion chamber on the outside into the combustion chamber, for the purpose of cooling the combustion and making it lean, thereby reducing the amount of NOx generated. In addition to cooling by the effusion cooling holes, the tiles are frequently also provided with a ceramic coating acting as an insulating layer against the high temperatures in the combustion chamber.

This arrangement is known from the state of the art, cf. EP 972 992 B1 or DE 102 14 570 A1.

These admixing holes are mostly designed as a funnel or tube projecting into the combustion chamber, thus forming a flow-guiding element (FIG. 3).

Tiles of this type are usually manufactured either by casting, coating with a ceramic layer and drilling of the effusion cooling holes (e.g. with laser), by casting, drilling and coating, or by additive manufacturing methods such as selective laser sintering, direct laser depositioning or electron-beam build-up welding. With the additive methods, the effusion cooling holes are made directly in the tile, and expensive drilling is not required.

When using additive methods to manufacture the tile with admixing holes protruding from the tile as shown in FIG. 4, an auxiliary structure to prevent downward sagging of the admixing hole geometry during the manufacturing process is needed in the case of a vertical arrangement of the tiles in the production machine.

A sub-structure of this type has considerable disadvantages a) it is material-intensive, b) it prolongs the manufacturing process, and c) it has to be removed from the tile after manufacture, which is very cost-intensive. To avoid this, a horizontal manufacture is frequently chosen, which has the disadvantage that fewer components can be manufactured in one operation, leading to substantially higher costs per component. A further alternative would be to provide the admixing hole geometry projecting into the combustion chamber in a further step, but this too involves costs.

DESCRIPTION AND SUMMARY OF THE INVENTION

The object underlying the present invention is to provide a combustion chamber tile of a gas turbine of the type specified at the beginning which while being simply designed and easily and cost-effectively producible avoids the disadvantages of the state of the art. Another object of the invention is to provide a suitable manufacturing method for a combustion chamber tile of this type.

It is a particular object to provide a solution to the above problems by a combination of features disclosed herein. Further advantageous embodiments will become apparent from the present disclosure.

It is thus provided in accordance with the invention that the combustion chamber tile has at least one supporting element which supports the mixing air hole or the flow-guiding element (chute) provided there in the case of vertical manufacture. The supporting element is here preferably provided on a side of the mixing air hole which is arranged on the side facing away from the flow along the combustion chamber tiles/surface.

In accordance with the invention, it is provided that the supporting element can have any shape, but is designed in a favourable embodiment as a rib of which the length and/or thickness depend on the size and the diameter of the mixing air hole or of the assigned flow-guiding element (chute). In accordance with the invention, the number of ribs is also arbitrary, as is their specific design, which can for example be flow-optimized.

In accordance with the invention, the combustion chamber tile is manufactured as already mentioned in a vertical arrangement by means of an additive manufacturing method, as is known from the state of the art. In accordance with the invention, the supporting element is arranged on that side of the admixing hole facing downwards during manufacture, in order to support the flow-guiding element (chute) during additive manufacture, in which material is applied layer by layer, and thereby prevent the chute from buckling or being deformed downwards during manufacture.

To optimize the flow along the completed combustion chamber tile, it is particularly favourable when the supporting element is arranged exclusively on that side of the mixing air hole or the flow-guiding element (chute), respectively, facing away from the flow.

It is particularly favourable when the supporting element is provided with effusion cooling holes to ensure good cooling of the combustion chamber tiles during operation.

With regard to the design and dimensioning of the preferably rib-shaped supporting element, it is provided in accordance with the invention that the supporting element is designed smaller than or equal to the diameter of the mixing air hole or of the flow-guiding element (chute).

It can be favourable in accordance with the invention to drill out the mixing air hole by means of a calibrating drilling operation after additive application of the material.

It is furthermore possible in accordance with the invention to remove the supporting element again after completion of the mixing air hole and/or of the flow-guiding element (chute), for example by grinding off.

The invention thus permits the manufacture of a combustion chamber tile, with the mixing air hole/flow-guiding element (chute) integrated into the combustion chamber tile, using additive methods in a vertical arrangement of the combustion chamber tile, thereby permitting a significant cost reduction compared with horizontal manufacture. The savings potential can be up to 50%.

BRIEF DESCRIPTION OF THE DRAWINGS

The present invention is described in the following in light of the accompanying drawing, showing exemplary embodiments. In the drawing.

FIG. 4 shows a side view of a manufacturing arrangement in accordance with the state of the art.

FIG. 5 shows a side view, by analogy with FIG. 4, of the inventive manufacturing embodiment in accordance with a first exemplary embodiment.

DETAILED DESCRIPTION OF THE INVENTION

Figure 1:
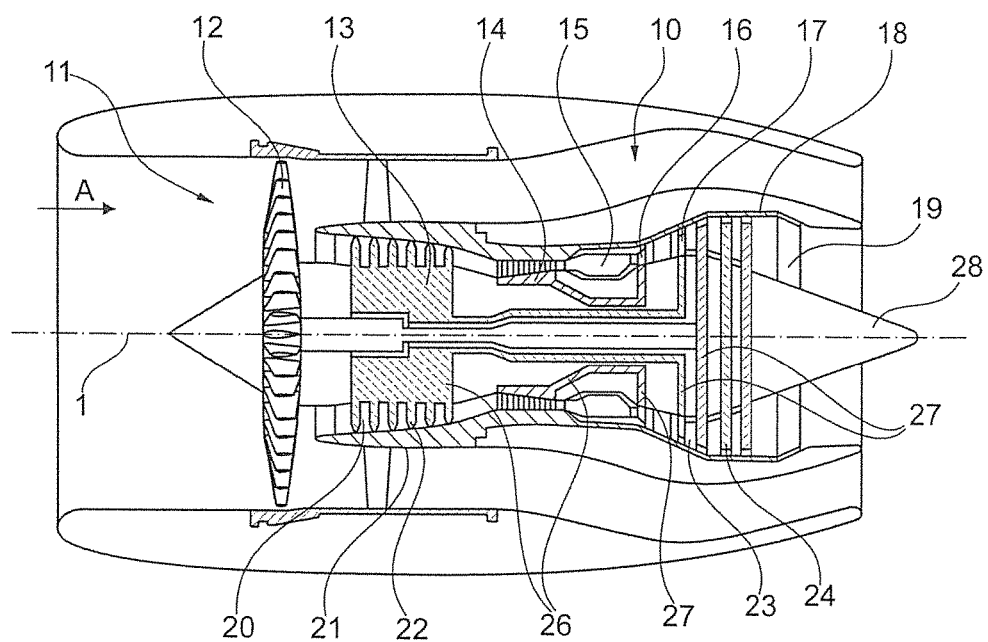
FIG. 1 shows a schematic representation of a gas-turbine engine in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Figure 2:
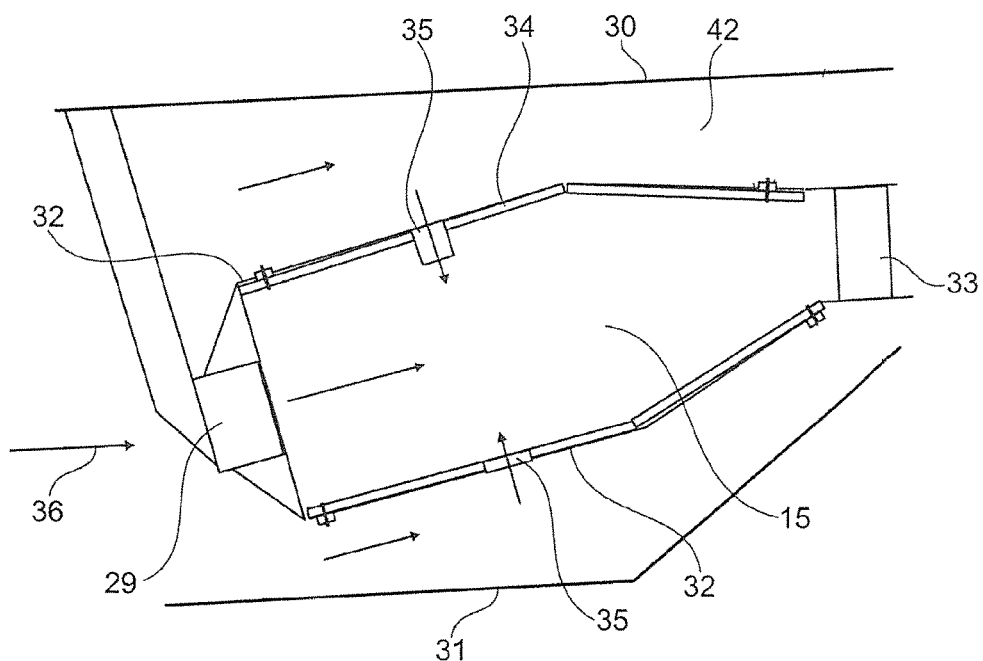
FIG. 2 shows a schematic (sectional) side view of a combustion chamber in accordance with the state of the art.

FIG. 2 schematically shows a combustion chamber 15. The combustion chamber 15 includes a fuel nozzle 29 which is mounted in the usual way on a combustion chamber head. Furthermore a combustion chamber outer casing 30 and a combustion chamber inner casing 31 are provided. A combustion chamber wall 32 encloses the combustion chamber 15 proper and supports combustion chamber tiles 34. The reference numeral 33 shows schematically a turbine inlet guide vane row. Air is supplied in the usual way through admixing holes 35. The inflow direction is indicated with the reference numeral 36.

Figure 3:
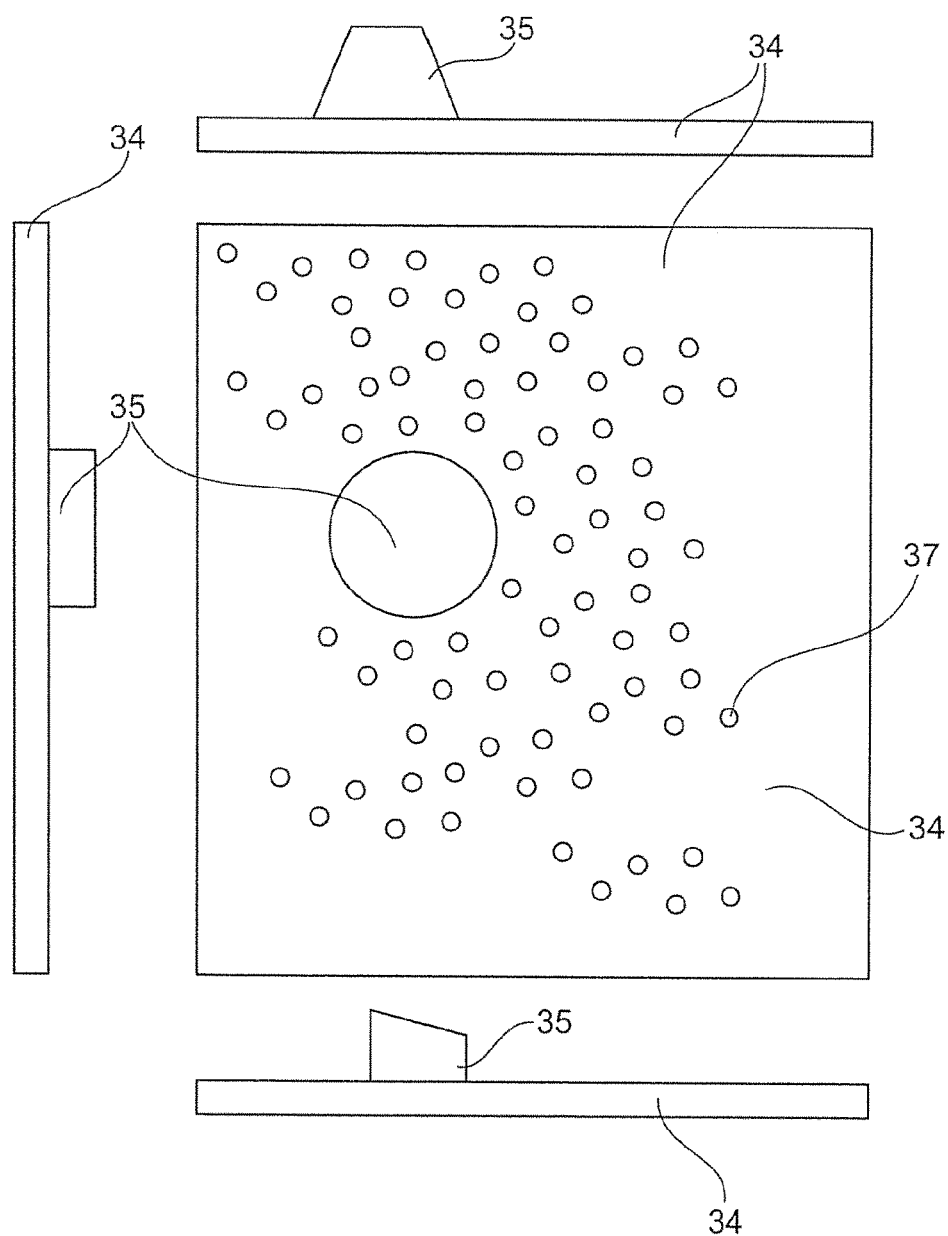
FIG. 3 shows a combustion chamber tile in accordance with the state of the art in top view and various side views.

FIG. 3 shows a combustion chamber tile 34 known from the state of the art in top view and various side views. In particular it can be seen here that the mixing air hole 35 is provided with a flow-guiding element (chute) projecting like a tube. Additionally, the combustion chamber tile 34 has a plurality of effusion cooling holes 37. The flow-guiding element (chute) 35 is designed substantially tube-shaped and its contour is chamfered for flow optimization.

FIG. 4 shows a side view of a manufacturing arrangement known from the state of the art n which a combustion chamber tile 34 is manufactured vertically by means of additive methods such as selective laser sintering, direct laser depositioning or electron-beam build-up welding. The effusion cooling holes 37 can be made directly in the combustion chamber tile 34, so that subsequent drilling is not required. FIG. 4 shows a machine bed 41 on which the combustion chamber tile 34 is vertically arranged. To permit the formation of the flow-guiding element (chute) 35, an additional sub-structure 38 is required that must be additionally provided for example in the form of a supporting beam or similar. The sub-structure 38 disrupts the additive manufacturing method, entails additional costs and represents an additional auxiliary component which needs separate handling.

FIG. 5 shows an embodiment in accordance with the invention, by analogy with FIG. 4, from which it can be seen that supporting of the flow-guiding element (chute) 35 with the admixing hole as achieved by means of at least one rib-like supporting element 39 which can be made first (manufacturing direction 40) and which supports subsequent manufacture of the flow-guiding element (chute) 35. This results, for the thin walls formed in the additive method, in sufficient stability of the flow-guiding element (chute) 35 during manufacture.

Figure 6:
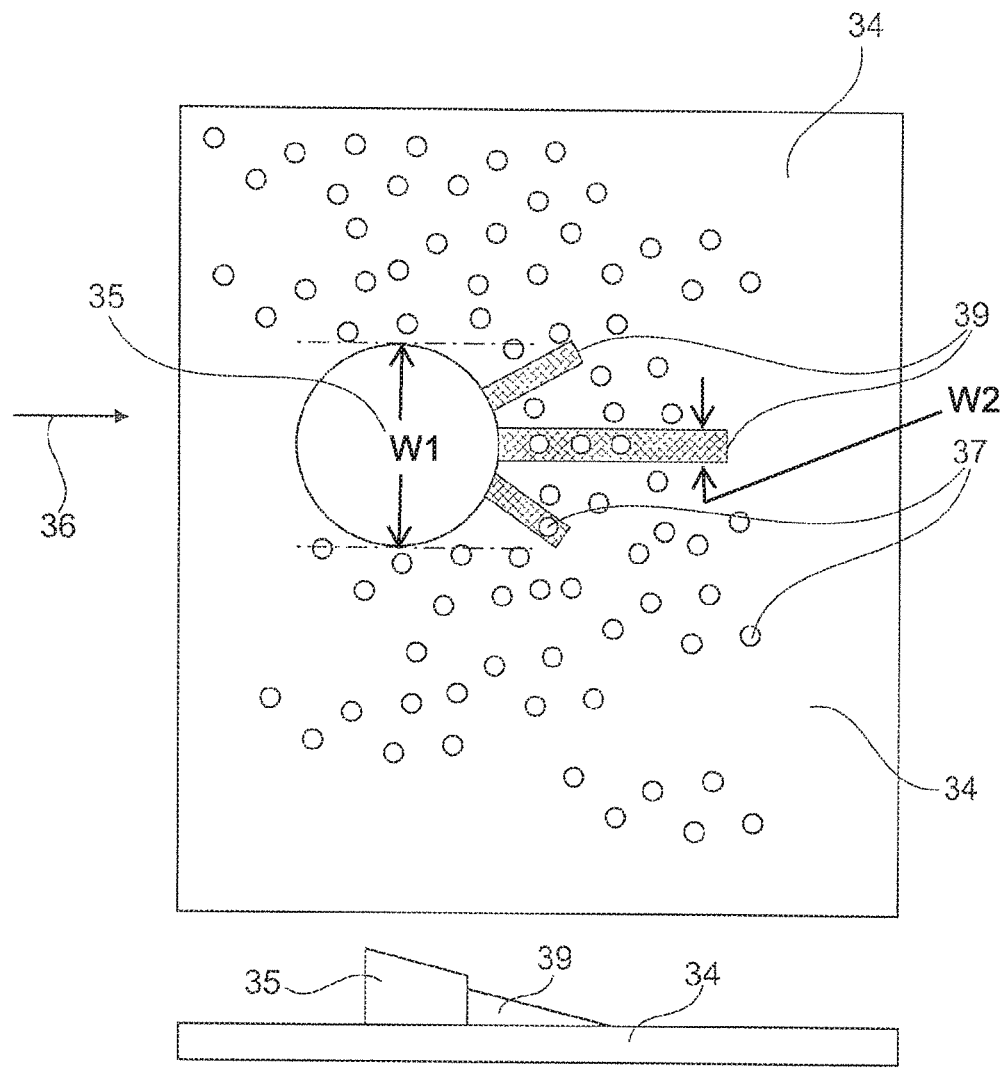
FIG. 6 shows an exemplary embodiment of a combustion chamber tile in accordance with the present invention in top view and side view.

FIG. 6 shows an exemplary embodiment of a combustion chamber tile 34 in accordance with the invention and provided with three rib-shaped (bracket-shaped) supporting elements 39. The latter are provided on that side of the mixing air hole 35 facing away from the inflow direction 36 and each have a low width. The width is dimensioned such that effusion cooling holes 37 can be provided in the supporting elements 39. A width W2 of the supporting element 39 is less than a diameter W1 of the flow guiding element 35.

Figure 7:
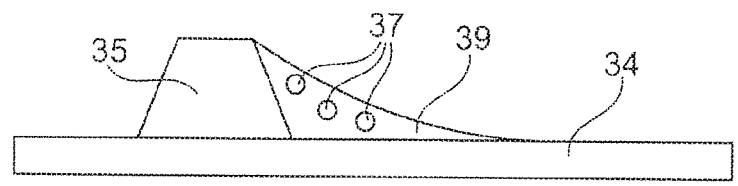
FIG. 7 shows a side view of a further exemplary embodiment of the present invention.

FIG. 7 shows a side view in which the supporting element 39 is not, as shown in FIG. 6, designed wedge-shaped, but is rounded and additionally provided with effusion cooling holes 37 which pass laterally through the supporting element 39.

Figure 8:
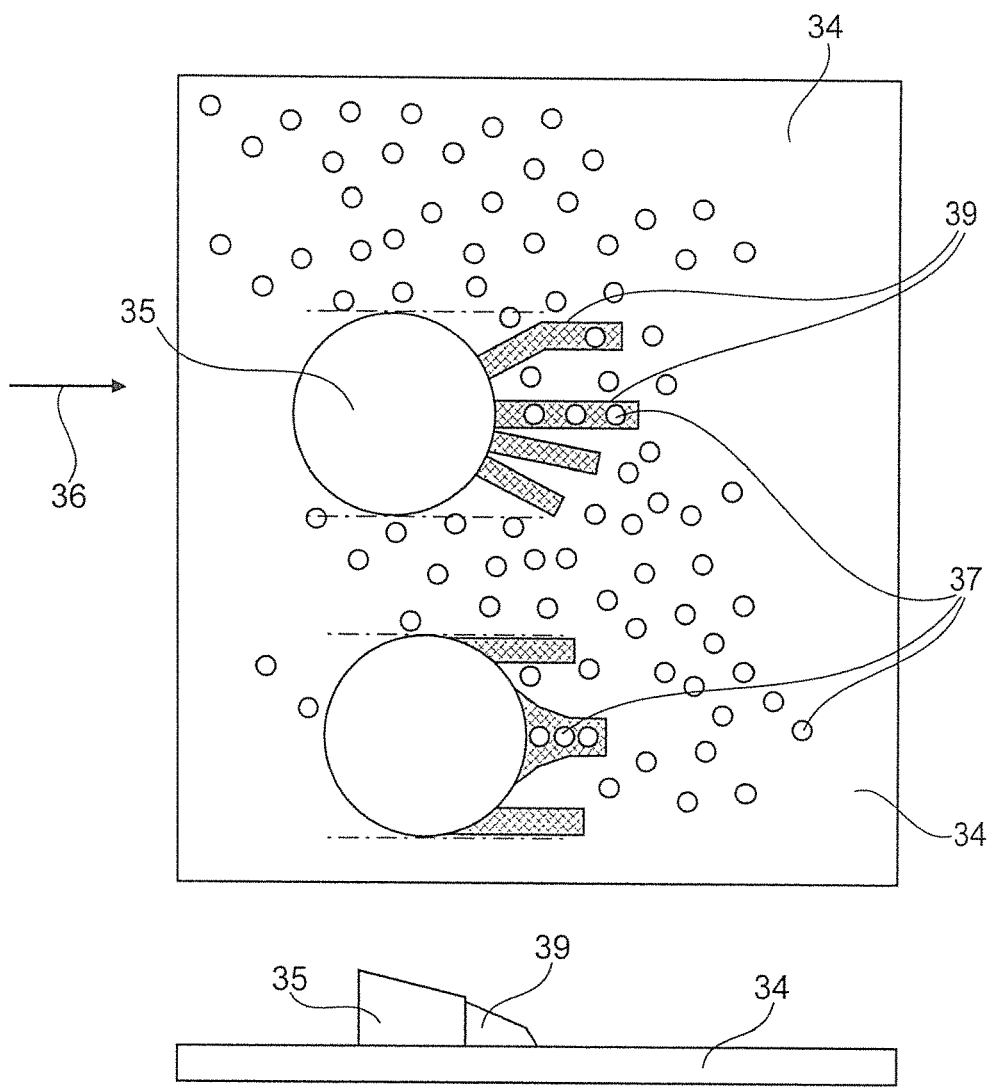
FIG. 8 shows a further exemplary embodiment of a combustion chamber tile in accordance with the present invention by analogy with the representation of FIG. 6 in top view and side view.
Figure 9:
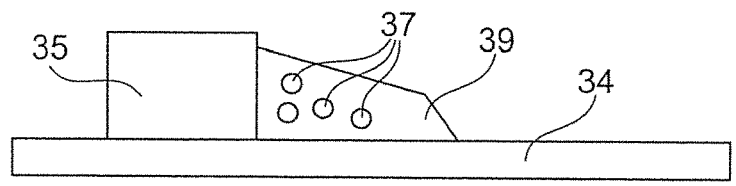
FIG. 9 shows a side view, by analogy with FIG. 7, of a further exemplary embodiment of the invention.

FIGS. 8 and 9 show alternative embodiments with several supporting elements 39 which are differently dimensioned and arranged and are also provided with effusion cooling holes 37.

LIST OF REFERENCE NUMERALS

1 Engine axis
10 Gas-turbine engine
11 Air inlet
12 Fan rotating inside the casing
13 Intermediate-pressure compressor
14 High-pressure compressor
15 Combustion chamber
16 High-pressure turbine 17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Fuel nozzle
30 Combustion chamber outer casing
31 Combustion chamber inner casing
32 Combustion chamber wall
33 Turbine inlet guide vane row
34 Combustion chamber tile
35 Flow-guiding element (chute) with admixing hole
36 Inflow direction
37 Effusion cooling hole
38 Sub-structure
39 Rib/supporting element
40 Manufacturing direction
41 Machine bed
42 Annulus

The invention claimed is:

1. A combustion chamber of a gas turbine, comprising:
a combustion chamber wall defining an interior of the combustion chamber,
a tile body attached to the combustion chamber wall in the interior of the combustion chamber downstream from a head of the combustion chamber, the tile body including an inner surface facing toward the interior of the combustion chamber and forming at least a portion of an interior surface of the combustion chamber wall,
a plurality of effusion cooling holes provided in the tile body,
a flow-guiding element provided on the tile body and projecting inwardly from the inner surface of the tile body into the interior of the combustion chamber to be positioned within a main flow through the interior of the combustion chamber along the tile body, the flow-guiding element including a mixing air hole extending through the tile body,
a supporting element connecting between the tile body and the flow-guiding element, the supporting element including at least a portion that extends into the interior of the combustion chamber inwardly beyond the inner surface to be positioned within the main flow only on a side of the flow guiding element facing away from a main direction of the main flow.

2. The combustion chamber in accordance with claim 1, wherein the supporting element is a bracket structure extending from the tile body.

3. The combustion chamber in accordance with claim 1, wherein the supporting element includes an effusion cooling hole.

4. The combustion chamber in accordance with claim 1, wherein the supporting element has a maximum width in a direction transverse to the main direction of the main flow which is less than or equal to an outer diameter of the flow-guiding element positioned within the main flow.

5. The combustion chamber in accordance with claim 1, wherein the supporting element is positioned entirely within an imaginary boundary channel extending downstream of the flow-guiding element in the main direction of the main flow, a cross-section of the imaginary boundary channel transverse to the main direction of the main flow being established by an external cross-section of the flow-guiding element transverse to the main direction of the main flow.

6. A method for manufacturing a combustion chamber of a gas turbine comprising:
providing a combustion chamber wall defining an interior of the combustion chamber,
manufacturing a tile body attached to the combustion chamber wall in the interior of the combustion chamber downstream from a head of the combustion chamber, the tile body including an inner surface facing toward the interior of the combustion chamber and forming at least a portion of an interior surface of the combustion chamber wall,
providing a plurality of effusion cooling holes in the tile body,
providing a flow-guiding element on the tile body and projecting inwardly from the inner surface of the tile body into the interior of the combustion chamber to be positioned within a main flow through the interior of the combustion chamber along the tile body, the flow-guiding element including a mixing air hole extending through the tile body,
manufacturing a supporting element connecting between the tile body and the flow-guiding element, the supporting element including at least a portion that extends into the interior of the combustion chamber inwardly beyond the inner surface to be positioned within the main flow only on a side of the flow guiding element facing away from a main direction of the main flow,
manufacturing the tile body in a vertical direction,
manufacturing the supporting element vertically below a position of the flow-guiding element,
making the effusion cooling holes simultaneously or subsequently in at least one chosen from the combustion chamber tile and the supporting element.

7. The method in accordance with claim 6, and further comprising machining the mixing air hole by a calibrating drilling operation.

8. The method in accordance with claim 6, and further comprising providing the supporting element and the mixing air hole are at a same time.

9. The method in accordance with claim 6, and further comprising providing the supporting element prior to providing the mixing air hole.

10. The method in accordance with claim 6, and further comprising manufacturing the combustion chamber tile by an additive manufacturing method.

11. The method in accordance with claim 6, and further comprising removing the supporting element after completion of the mixing air hole.

12. The method in accordance with claim 6, and further comprising providing that the supporting element is positioned entirely within an imaginary boundary channel extending downstream of the flow-guiding element in the main direction of the main flow, a cross-section of the imaginary boundary channel transverse to the main direction of the main flow being established by an external cross-section of the flow-guiding element transverse to the main direction of the main flow.

13. A combustion chamber of a gas turbine, comprising:
a combustion chamber wall defining an interior of the combustion chamber,
a tile body attached to the combustion chamber wall in the interior of the combustion chamber downstream from a head of the combustion chamber, the tile body including an inner surface facing toward the interior of the combustion chamber and forming at least a portion of an interior surface of the combustion chamber wall, a plurality of effusion cooling holes provided in the tile body, a flow-guiding element provided on the tile body and projecting inwardly from the inner surface of the tile body into the interior of the combustion chamber to be positioned within a main flow through the interior of the combustion chamber along the tile body, the flow-guiding element including a mixing air hole extending through the tile body, a supporting element connecting between the tile body and the flow-guiding element, the supporting element including at least a portion that extends into the interior of the combustion chamber inwardly beyond the inner surface to be positioned within the main flow on a side of the flow guiding element facing away from a main direction of the main flow, wherein the supporting element has a maximum width in a direction transverse to the main direction of the main flow that is less than or equal to an outer diameter of the flow-guiding element positioned within the main flow.

\* \* \* \* \*